UNITED STATES PATENT OFFICE.

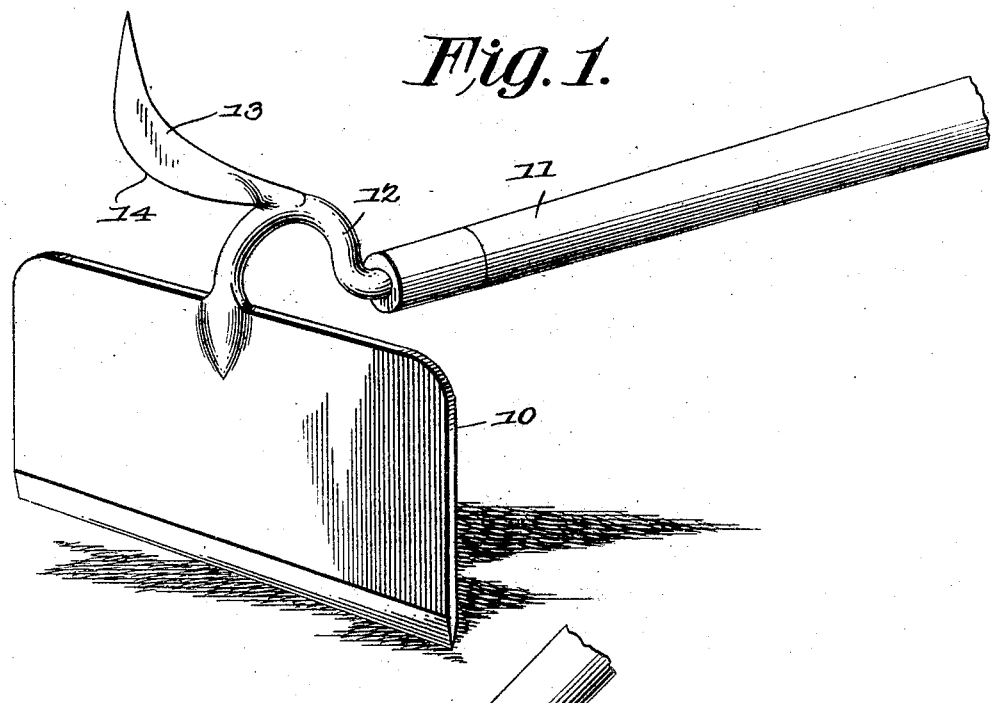
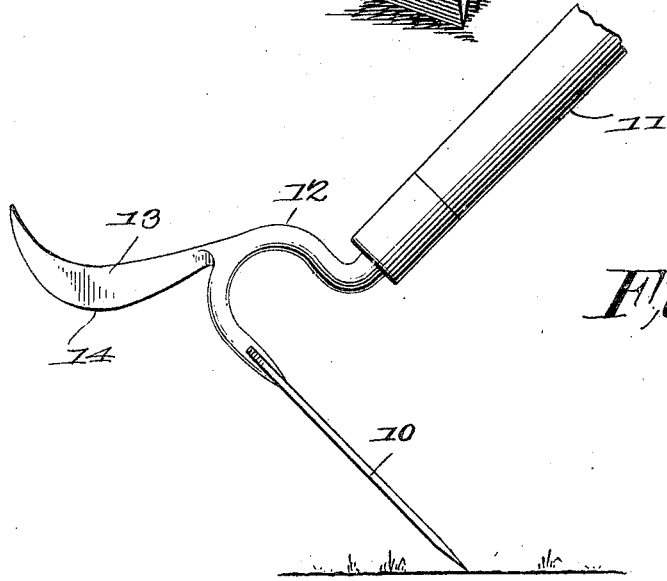

SAMUEL JAKE GARNER, OF TEMPLE, TEXAS.

HOE ATTACHMENT.

No. 801,978.　　　Specification of Letters Patent.　　　Patented Oct. 17, 1905.

Application filed March 24, 1905. Serial No. 251,884.

*To all whom it may concern:*

Be it known that I, SAMUEL JAKE GARNER, a citizen of the United States, residing at Temple, in the county of Bell and State of Texas, have invented a new and useful Hoe Attachment, of which the following is a specification.

This invention relates to hand weeding or garden hoes of various sizes and forms, and has for its object to provide a cutting-blade attachment for implements of this character for assisting in detaching clinging vines and runners from the growing plants.

With this and other objects in view, which will appear as the nature of the invention is better understood, the same consists in certain novel features of construction, as hereinafter fully described and claimed.

In the accompanying drawings, forming a part of this specification and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a perspective view, and Fig. 2 is a side elevation, of the improved implement.

The improved device comprises a weeding-blade 10 of the usual form and connected to the handle 11 by the shank 12, preferably curving upwardly, as shown. Extending from the shank 12 is a cutting-blade 13, curving forwardly or away from the handle 11 and disposed at right angles to the weeding-blade and in alinement with the handle and shank and with the curved cutting edge 14 presented forwardly.

In using the implement the cutting-blade is forced forwardly or away from the operator with a pushing motion, as will be obvious, and by its peculiar form and position is very convenient for severing vines, runners, creepers, and similar plant life from the stalks of the growing and valuable plants.

The device will also be found very convenient for "chopping" cotton or thinning cotton and other plants and will also be found very useful in working corn and similar crops upon which vines and creepers are very liable to be found and whose removal has heretofore been attended with much labor and annoyance.

With the simple implement herein described and shown the labor is very materially decreased and much valuable time saved.

The cutting-blade 13 will preferably be formed integral with the shank 12 and will not be a cumbersome or objectionable addition to the hoe.

Having thus described the invention, what is claimed is—

1. As a new article, a hoe having a cutting-blade extending from the shank thereof at the side opposite the weeding-blade with the cutting edge presented forwardly.

2. As a new article, a hoe having a cutting-blade extending from the shank thereof at the side opposite the weeding-blade and integral therewith, with the cutting edge presented forwardly.

In testimony that I claim the foregoing as my own I have hereto affixed my signature in the presence of two witnesses.

SAMUEL JAKE GARNER.

Witnesses:
　J. A. MILLERMAN,
　JAS. P. KINNARD.